United States Patent [19]
Finzer

[11] 3,877,125
[45] Apr. 15, 1975

[54] METHOD FOR A TUBULAR ROLLER SLEEVE

[75] Inventor: John O. Finzer, Wilmette, Ill.

[73] Assignee: Finzer Roller Company, Wilmette, Ill.

[22] Filed: Feb. 11, 1974

[21] Appl. No.: 441,326

[52] U.S. Cl. ........................ 29/148.4 D; 29/DIG. 19
[51] Int. Cl. ......................... B21h 1/14; B23p 11/00
[58] Field of Search ........ 29/148.4 D, 148.4 R, 132, 29/DIG. 19

[56] References Cited
UNITED STATES PATENTS

| | | | |
|---|---|---|---|
| 3,014,266 | 12/1961 | Samuels et al. | 29/148.4 D |
| 3,248,775 | 5/1966 | Morrow | 29/148.4 D |
| 3,711,913 | 1/1973 | Galeone et al. | 29/148.4 D |

Primary Examiner—Thomas H. Eager
Attorney, Agent, or Firm—Mann, Brown, McWilliams & Bradway

[57] ABSTRACT

A method for a rubber-sleeved roller including a tubular sleeve preferably fabricated from a plastic material and formed with a smooth internal surface to fit on the smooth outer peripheral surface of a metal core and having a tubular rubber sleeve formed on the outer peripheral surface of the nonmetallic sleeve with the rubber sleeve finish ground to a smooth outer peripheral surface on the nonmetallic sleeve whereby the tubular sleeve structure may be readily interchangeable with a similar sleeve structure on a metal core.

7 Claims, 3 Drawing Figures

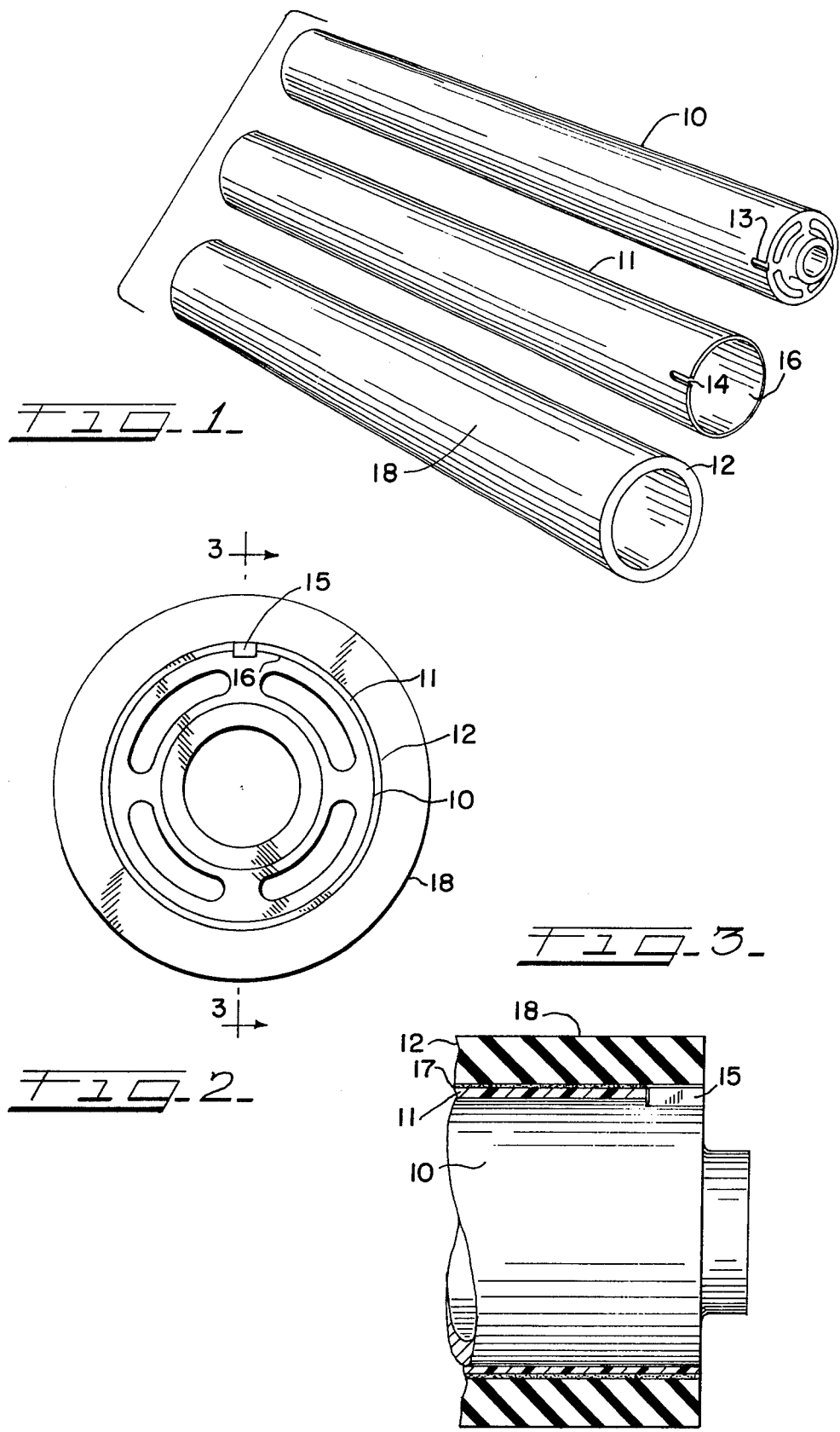

METHOD FOR A TUBULAR ROLLER SLEEVE

BACKGROUND OF THE INVENTION

Heretofore it has been proposed to provide a preformed outer covering and mount it on a metal core with the covering being manufactured at one location and then shipped to another location for application to a metal core with the covering being finish ground to provide the smooth outer surface required, after the covering is mounted on and permanently secured on the core. A printer's roller of such type is disclosed in U.S. Pat. No. 3,184,355 to James K. Brown. In this disclosure the inventor vulcanizes a sleeve of extruded rubber to a stretched knitted cotton fabric lining and this lining may be saturated with an adhesive for mounting on the core but the outer peripheral surface of the extruded rubber sleeve cannot be finish ground until the rubber is mounted on the core and permanently set.

The patentee emphasizes "the advantage of facilitating repair and maintaining of the roller at maximum operating efficiency at a location remote from the place of manufacture, with the consequent material savings of the time and cost of shipping the metal core back to the place of manufacture." This means that the extruded rubber sleeve, including its cotton fabric sleeve lining, after its manufacture on the "steel mandrel dimensioned substantially the same as the core" must be "stored or shipped for future use at any desired point." It necessarily follows that the extruded rubber sleeve is mounted on the metal core only at the point of use, after which it must be finish ground, on the core, to provide the smooth outer peripheral surface necessary to the proper functioning of the roller in such use.

The patentee states that his "outer covering 12" may be used immediately but does not suggest that this can be done at the point of manufacture which is contrary to the inventive concept disclosed. The extruded rubber covering can only be installed on the metal core at the point of use after removing an old covering and cleaning the core "preferably with sandpaper." It would be inconsistent with this disclosure to suppose that the rubber covering could be permanently mounted on the metal core at the point of manufacture and then incur the asserted penalty that "a considerable part of the costs comes from the expense and time required for transporting the rollers between manufacturing or repair centers and use locations" as pointed out initially in the patent as an object to reduce the cost to the user.

The relatively soft, non-rigid structure of the extruded rubber sleeve as vulcanized onto the knitted cotton fabric sleeve lining makes it necessary to finish grind the outer peripheral surface of the rubber only after it has been mounted on the metal core and allowed to permanently set. It is pointed out in the patent that the roller, after the inner fabric lining is thoroughly saturated with a suitable metal-fabric adhesive and the covering is slipped over a metal core while the adhesive is still wet, must be allowed to stand overnight for curing or setting of the adhesive to form an effective bond between the core and the covering. This involves a considerable loss of time at the point of use, especially in view of the fact that the roller must be "finish ground and polished in conventional manner, and the end portions of the outer covering 12 may readily be trimmed to conform to the end surfaces of the main part of the metal core." These facts all confirm the necessity for mounting and finishing the rubber covering at the point of use.

The inventor Brown also has U.S. Pat. No. 3,750,250 disclosing a printer's roller having a rubber sleeve but the concept here has to do with the manufacture of a light-weight roller complete with end journals and which eliminates the usual relatively heavy metal core to reduce the cost of the roller to the point where it becomes feasible for a user to discard an entire roller when the rubber becomes worn and requires maintenance. This appears to be the principal purpose of the invention and is described in the patent as being obtained by extruding a sleeve of rubber, or by casting the sleeve from an elastomer onto a long aluminum tube and then cut this tube, with the sleeve installed, into the required lengths to provide individual rollers that are completed by the mounting of journals in the ends of the individual lengths. These journals are stated to be injection molded in plastic and secured in the aluminum tube lengths by adhesive or by a press fit. The completed assembly is thereafter trued by finish grinding the outer peripheral surface of the sleeve and the ends trimmed to provide a complete roller said to be cheap enough to be thrown away when replacement becomes necessary.

SUMMARY OF THE INVENTION

Contrast these prior art arrangements with the present invention which in its basic concept overcomes all of the shortcomings of prior roller constructions and includes all of the advantages afforded by a tubular rubber sleeve mounted on a substantially rigid backing in the form of a tubular inner sleeve which may readily be slipped over the usual metal core and secured in a manner which enables quick and easy replacement when the rubber becomes worn. The design and construction of the roller is such that minimum costs are incurred in the manufacture of the complete roller structure so that minimum expense is involved when a worn roller is discarded upon replacement.

Distinguished from previous roller constructions this roller sleeve is fabricated completely at the point of manufacture and may be furnished to a user in quantities such that a supply of the tubular rollers sleeves may be maintained available for convenient use in the maintenance of operating rollers at the greatest possible efficiency. The tubular rubber sleeves are comprised of an inner tubular sleeve which is preferably made from a suitable plastic material and an outer tubular sleeve of rubber which is mounted directly on the inner sleeve and vulcanized thereon. The tubular rubber sleeve may be molded on the plastic inner sleeve or applied thereto by any other suitable method. After the rubber is securely joined with the plastic inner sleeve it is trued by finish grinding the outer peripheral face of the roller to provide the smooth operating surface necessary in the normal usage of a roller of this type.

OBJECTS OF THE INVENTION

It is the primary purpose of this invention to provide a method for a tubular roller sleeve entirely of nonmetallic construction which may readily be slipped onto a metal core in replacement of a worn sleeve.

The principal object of the invention is the provision of a method for a tubular roller sleeve having an inner sleeve preferably made from a suitable plastic material and an outer sleeve secured directly on the inner sleeve and comprised of a suitable rubber material or other elastomer or the like.

An important object of the invention is to provide a method for a tubular roller sleeve comprised of an outer tubular rubber sleeve secured directly on an inner tubular sleeve lining which is fabricated from a suitable plastic material and wherein the outer peripheral surface of the tubular rubber sleeve is trued by finish grinding the face of the roller as a step in the manufacture of the completed roller.

A further and important object of the invention is the provision of a method for a tubular roller sleeve of nonmetallic construction.

DESCRIPTION OF PREFERRED EMBODIMENT

The foregoing and other and more specific objects of the invention are attained by the tubular roller sleeve of nonmetallic construction illustrated in the accompanying drawings wherein FIG. 1 is an exploded perspective view showing the plastic sleeve of the invention with the rubber sleeve separated therefrom for clarity and a metal core upon which the combined rubber and plastic sleeves are mounted:

FIG. 2 is an end elevational vaiew of the metal core with the plastic and rubber sleeve installed; and FIG. 3 is a fragmentary sectional view through the plastic and rubber sleeve on the metal core taken on the line 3 — 3 of FIG. 2.

In the drawings 10 represents a metal core of the type with which the tubular sleeve of the invention may be used. The tubular inner sleeve 11 is illustrated in the exploded view of FIG. 1 removed from the metal core 10 and is shown with the rubber sleeve 12 separated therefrom for purposes of the illustration of the structure, but in practice the rubber 12 fabricated directly on the tubular sleeve 11 by molding the rubber on the inner sleeve or by vulcanizing the rubber sleeve on the sleeve 11 by any other suitable process. The metal core 10 is provided with a keyway 13 and the inner sleeve 11 is provided with a keyway 14, which, when the tubular sleeve 11 with the integrated rubber sleeve 12 attached thereto, is slid endwise onto the metal core, affords a secure means of fastening the rubber faced tubular sleeve on the metal core by a key 15 illustrated in FIG. 2.

In the practice of this invention the tubular inner sleeve 11 is formed with a smooth interior surface 16 dimensioned to provide a close fit on the cylindrical outer surface of the metal core 10 and the keyway 14 is formed therein. The outer rubber sleeve 12 is securely attached on the inner sleeve 11 so that to all intents and purposes the rubber sleeve becomes integrated with the inner sleeve. If preferred, the rubber sleeve 12 may be formed separately be extrusion, or by molding, or by any suitable process and then mounted on the inner sleeve 11 and securely attached thereto by the use of a suitable adhesive cement 17 (see FIG. 3) which is used to provide a permanent bond between the rubber sleeve and the inner sleeve.

An important element, or step, in the manufacture of the tubular rubber sleeve comprises the truing of the outer peripheral surface 18 at the point of manufacture as a part of the manufacturing process to provide a completed tubular sleeve structure before it leaves the manufacturing plant. The rubber sleeve 12 is permanently mounted on its inner sleeve 11 and the peripheral outer face 18 is finish ground to provide a surface that is smooth and true so that when the sleeve is slipped onto a metal core by a user as a replacement for a worn unit a perfect working surface is provided. The completed tubular sleeve structure comprising the inner sleeve 11 and the finish ground outer rubber sleeve 12 may be stored at the manufacturing plant or a warehouse for future shipment to a user, or the completed sleeves may be stockpiled by the user so that when an operating unit becomes worn and requires replacement it is necessary merely to remove a sleeve from stock and substitute it for the worn unit by a simple mounting operation without the need for any finishing of the working surface 18 of the roller sleeve.

The invention may be used with a new metal core 10 or, where a user may prefer to avoid the expense of a new core, an existing core may be removed from operation and cleaned by completely removing the worn rubber sleeve and grinding or sanding the outer peripheral surface of the core to provide a polished cylindrical surface similar to a new core, onto which the sleeve structure of the invention may then be slipped, whereby a permanently renewable roller sleeve arrangement is had affording all of the advantages of the single sleeve replacement system which this invention provides.

I claim:

1. The method of making a rubber-sleeved roller which comprises providing a metal core, providing an inner sleeve of tubular form having an inside diameter to provide a close fit on the outside surface of said core, forming a tubular sleeve of rubber having an inside diameter to provide a substantially close fit between said inner tubular sleeve and the tubular rubber sleeve, said tubular rubber sleeve being adhered to said inner sleeve by a layer of adhesive filling the area between the rubber sleeve and said inner sleeve, finish grinding and polishing said tubular rubber sleeve to provide a smooth outer peripheral surface, and mounting said finished tubular sleeve on said metal core with said inner sleeve in engagement with and secured to said metal core.

2. The method of making a rubber-sleeved roller as set forth in claim 1 wherein said nonmetallic tubular sleeve is fabricated from a plastic material selected from the group comprising polyethylene, polypropylene, polyvinyl chloride, and polystyrene.

3. The method of making a rubber-sleeved roller which comprises providing a metal core, providing a nonmetallic tubular sleeve having an inside diameter substantially similar to the outside diameter of said metal core, forming a tubular sleeve of rubber and mounting the tubular rubber sleeve on the tubular nonmetallic sleeve and securing said sleeves against relative displacement, finish grinding and polishing the tubular rubber sleeve to provide a smooth outer peripheral surface, and mounting said finished tubular sleeve on said metal core with said nonmetallic sleeve in bearing engagement with and secured to said core.

4. The method of making a rubber-sleeved roller as set forth in claim 3 wherein said nonmetallic tubular sleeve is fabricated from a plstic material selected from the group comprising polyethylene, polypropylene, polyvinyl chloride, and polystyrene.

5. The method of providing a rubber-sleeved roller which comprises stripping the rubber from an existing metal core and cleaning said core to remove all traces of rubber therefrom, providing a non-metallic sleeve of tubular form having an inside diameter substantially similar to the outside diameter of said metal core, forming a tubular sleeve of rubber, mounting said tubular rubber sleeve on said non-metallic tubular sleeve and securing said sleeves against displacement, finish grinding and polishing said tubular rubber sleeve to provide a smooth outer peripheral surface, and mounting said finished tubular sleeve on said metal core with said non-metallic sleeve in engagement with and secured to said core.

6. The method of providing a rubber-sleeved roller as set forth in claim 5 wherein said nonmetallic tubular sleeve is fabricated from a plastic material selected from the group including polyethylene, polypropylene, polyvinyl chloride, and polystyrene.

7. The method of making a rubber-sleeved roller which comprises providing a metal core, providing an inner sleeve of tubular form, forming a tubular sleeve of rubber on said inner tubular sleeve, said tubular rubber sleeve being adhered to said inner sleeve, finish grinding and polishing said tubular rubber sleeve to provide a smooth outer peripheral surface, and mounting said finished tubular sleeve on said metal core with said inner skeeve in engagement with and secured to said metal core, said inner tubular sleeve being fabricated from a plastic material selected from the group comprising polyethylene, polypropylene, polyvinyl chloride and polystyrene.

* * * * *

PO-1050
(5/69)

UNITED STATES PATENT OFFICE
CERTIFICATE OF CORRECTION

Patent No. 3,877,125      Dated April 15, 1975

Inventor(s) JOHN O. FINZER

It is certified that error appears in the above-identified patent and that said Letters Patent are hereby corrected as shown below:

Column 3, line 27 "vaiew" should read --view--; Column 4, line 47, in Claim 2 "1" should read --3--.

Signed and Sealed this twenty-ninth Day of July 1975

[SEAL]

Attest:

RUTH C. MASON
Attesting Officer

C. MARSHALL DANN
Commissioner of Patents and Trademarks